United States Patent [19]
Mirashrafi et al.

[11] Patent Number: 5,889,774
[45] Date of Patent: *Mar. 30, 1999

[54] METHOD AND APPARATUS FOR SELECTING AN INTERNET/PSTN CHANGEOVER SERVER FOR A PACKET BASED PHONE CALL

[75] Inventors: Mojtaba Mirashrafi; John D. Elliott, both of Portland; Michael F. Buondonno, Beaverton; Kenneth L. Keeler, Hillsboro, all of Oreg.; Keith A. Pirkl, Vancouver, Wash.; Al J. Simon, Hillsboro, Oreg.; George L. Taylor, Tigard, Oreg.; Mark D. Zuber, Beaverton, Oreg.

[73] Assignee: eFusion, Inc., Beaverton, Oreg.

[*] Notice: This patent issued on a continued prosecution application filed under 37 CFR 1.53(d), and is subject to the twenty year patent term provisions of 35 U.S.C. 154(a)(2).

[21] Appl. No.: 818,828

[22] Filed: Mar. 14, 1997

[51] Int. Cl.[6] ............ H04L 12/66; H04L 12/50; H04L 12/28; H04M 11/00
[52] U.S. Cl. ................... 370/352; 379/100.15
[58] Field of Search ................... 370/352, 353, 370/380, 389, 392, 396, 401, 404, 427, 435, 450, 465, 485; 379/90.01, 93.01, 93.05, 93.09, 100.15, 100.16

[56] References Cited

U.S. PATENT DOCUMENTS

| | | | |
|---|---|---|---|
| 4,771,425 | 9/1988 | Baran et al. | 370/85 |
| 4,866,704 | 9/1989 | Bergman | 370/452 |
| 5,327,486 | 7/1994 | Wolff et al. | 379/93.23 |
| 5,526,353 | 6/1996 | Henley et al. | 370/60.1 |
| 5,553,063 | 9/1996 | Dickson | 370/29 |
| 5,572,643 | 11/1996 | Judson | 395/793 |
| 5,583,920 | 12/1996 | Wheeler, Jr. | 379/88 |
| 5,608,446 | 3/1997 | Carr et al. | 348/6 |
| 5,608,786 | 3/1997 | Gordon | 370/352 |
| 5,610,910 | 3/1997 | Focsaneanu et al. | 370/351 |
| 5,742,596 | 4/1998 | Baratz et al. | 370/356 |
| 5,742,670 | 4/1998 | Bennett | 379/142 |

FOREIGN PATENT DOCUMENTS

97/26749  1/1997  WIPO .

Primary Examiner—Chau Nguyen
Assistant Examiner—Allan Hoosain
Attorney, Agent, or Firm—Blakely, Sokoloff, Taylor & Zafman, LLP

[57] ABSTRACT

A method and apparatus for establishing a voice call to a PSTN extension on behalf of a networked client computer, and routing the voice call off of the network, is provided. In a first embodiment, the apparatus comprises a storage medium having stored therein a plurality of programming instructions for implementing a set of communication services for facilitating establishment of the voice call to the PSTN extension, and an execution unit, coupled to the storage medium, for executing the plurality of programming instructions. The set of communication services include services for soliciting inputs from one or more other apparatuses on one or more operating characteristics associated with the establishment and support of the voice call to the PSTN extension, and selecting either the apparatus itself or one of the other apparatuses to place the voice call to the PSTN extension.

33 Claims, 4 Drawing Sheets

METHOD AND APPARATUS FOR SELECTING AN INTERNET/PSTN CHANGEOVER SERVER FOR A PACKET BASED PHONE CALL

BACKGROUND OF THE INVENTION

1. Field of the Invention

The present invention relates to the field of telecommunications and, in particular, to a method and apparatus for selecting an internet/PSTN changeover server for a packet based phone call.

2. Background Information

Numerous advances have been made in recent years in the field of telecommunications. In particular, the field of internet telephony has emerged as a viable technology that is evolving at an ever increasing rate. Evidence of this evolution of internet telephony is best characterized by the number of new products recently become available in the market. Products such as CoolTalk by Netscape Communications Corporation of Mountain View, Calif.; Internet Connection Phone by International Business Machines of Amonk, N.Y.; Intel Internet Phone (IPhone) by Intel Corporation of Santa Clara, Calif.; NetMeeting by Microsoft Corporation, Redmond, Wash.; Quarterdeck WebTalk by Quarterdeck Corporation of Marina Del Rey, Calif.; TeleVox by Voxware Incorporated of Princeton, N.J.; and WebPhone by Netspeak Corporation of Boca Raton, Fla., are representative of the current state of applications facilitating interent telephony.

Each of these products offers internet based voice communications with a telephone motif, between two users each using the same (or compatible) product on either end of the internet connection. That is, the internet provides the "switching" architecture for the system, while the computer acts as the "handset", or the audio interface. One reason for the proliferation of these applications is a desire to push the technology of the internet to provide a total communications tool. The appeal to users is that, currently, the use of the internet is free of toll charges. Therefore, currently, a user of an internet phone product may communicate with another user located anywhere else in the world without having to pay the long distance charges associated with making a telephone call using the public switched telephone network (PSTN).

However, consumers expecting to completely eliminate their long-distance telephone bills through the exclusive use of internet telephony are in for a disappointment. As they shall soon discover, although innovative in their own right, the current internet based telephony applications identified above have a number of limitations which retard their acceptance as a primary communications tool. One such limitation is that many of the applications identified above require that both users have installed the same software package, or compatible packages and, therefore, provide a relatively low level of interoperability. One reason for this lack of interoperability between internet telephony applications is that the developers of many of these products have incorporated different voice encoders (commonly referred to as a "voice codec", or simply a "codec" by those in the telecommunication arts) in the products. Consequently, as a result of the different codecs used, many internet telephony applications are unable to recognize speech encoded (i.e., digitized) by a codec of a disimilar application.

This problem is alleviated for those products that are upgraded to comply with emerging telephony standards, such as International Telecommunication Union's (ITU) H.323 standard. However, other limitations remain. For example, another limitation associated with many of these products is that they are tied to the internet, often requiring all users to access a common server in order to maintain a directory of available users in which to call. That is to say, many of the applications identified above do not integrate the packet switched network of the internet with the circuit switched public switched telephone network (PSTN). Therefore, although a computer connected to the internet may communicate with another user on the internet, assuming they are both using a common software application (or at least applications with compatible codecs), these applications do not support communication with a user of a Telephone handset.

The reason for this limitation is readily understood by those who appreciate the complexity of the two networks. As alluded to above, the internet is a packet switched network. That is to say, communication over the internet is accomplished by "breaking" the transmitted data into varying-sized packages (or "packets"), based primarily on communication content, and interleaving the various-sized packages to best utilize the bandwidth available at any given time on the internet. When the packets reach their intended destination, they must be reassembled into the originally transmitted data. Loss of packets, and thus data, occur frequently in such a network, and the ability of the network to succesfully transmit information from one point in the network to another determines the quality of the network. For inter-computer communication transactions involving non real- time data, the ability to transmit packets and retransmit any packets that are perceived to have been dropped is not a severe limitation and may not even be perceived by the user of the system. However, in a voice communication transaction, the delay required to retransmit even one data packet may be perceived by a user. At best, such delays are an annoying inconvenience. In practice, the delays actually can become intolerable, as the cumulative latency adds up with successive transmissions.

In contrast to the packet switched network of the internet, the public switched telephone network (PSTN) is a circuit switched network. That is to say that the PSTN assigns a dedicated communication line to a user with which to complete the telephone call, wherein the user can utilize the assigned resource of the PSTN in any way they choose, with the understanding that the user is paying for the use of the dedicated resource of the PSTN. While the circuit switched approach of the PSTN system is not necessarily the most efficient system in terms of call traffic (i.e., it does not make use of the "dead space" common in a conversation), it is relatively easy to ensure that information destined for a particular user is delivered, it simply provides a dedicated line to complete the transaction.

Nonetheless, despite these engineering challanges, a few products have emerged which purport to integrate the PSTN to the internet. Products such as Net2Phone by IDT Corporation of Hackensack, N.J., claim to provide a computer user with the ability to place and receive a phone call to/from a PSTN extension. Unfortunately, none of these products completely solve the problem of integrating the two networks. The limitations perhaps best characterized by way of an example communication session. With these prior art internet telephony applications, a user of an internet telephony enabled client computer initiating a telephone call to a Telephone handset launches the voice call from the client computer by accessing a server (the primary access server), operated by the developer of the internet telephony application that supports internet telecommunications. As the initiator accesses the primary access server, he/she is prompted for a destination address, which takes the form of a PSTN telephone number for an outgoing call to a Telephone handset. Having provided the primary access server with the PSTN telephone number associated with the Telephone handset, the primary server somehow determines[1] which server in a community of similarly enabled servers (i.e., servers with the hardware/software necessary to provide access to the PSTN) is closest to the destination address, and completes the telephone call by routing the telephone call through a number of intermediate servers on the internet to the selected server, which will actually place the voice call to the Telephone handset on behalf of the client computer, facilitating the voice call between the client computer and the Telephone handset. In other words, the user of the client computer is required to have prior knowledge of the destination phone number, which is limiting in many circumstances. For example, in a situation where the user of the client computer is engaged in a data communication session involving a webpage for a corporate entity, the user may wish to speak with someone in a "local office" of the corporate entity. Prior art internet telephony applications require that the telephone number for the "local office" of the corporate entity be provided by the user of the client computer in order to place the telephone call. If the telephone number for the "local office" of the corporate entity is not provided by the webpage, the user of client computer must look it up or have prior knowledge of it.

[1] The manner in which the "primary access server" determines the "call originating server" is not known Additionally, while the prior art approach of simply finding the internet telephony enabled server closest to the destination address may offer the simplest technical solution and a seemingly cheaper connection, it does not ensure the quality of the voice connection. One skilled in the art will appreciate that there are a number of characteristics which may impact the quality of the voice connection. For example, insofar as the internet is a packet switched network, as the number of intermediate routers required to interface the client computer to the selected server increases so, too, does the likelihood that data packets containing voice information could be lost or corrupted. The result of lost or corrupted data packets is broken or garbled speech. Another factor affecting internet telephony communication performance is the bandwidth available on the selected server. If, for example, the selected server is very busy handling a number of other processes, the performance associated with each of the processes begins to degrade (i.e., slow down), which may also result in delayed delivery of data packets containing speech, which in turn results in user perception of poor quality. Therefore, while it is important to some users of internet telephony applications to simply keep the cost down, quality considerations must also be accounted for to enable internet telephony to evolve into a viable communications tool.

Thus, a need exists for a method and apparatus for selecting an internet/PSTN changeover server for a packet based phone call that is unencumbered by the limitations associated with the prior art.

SUMMARY OF THE INVENTION

In accordance with the teachings of the present invention, a method and apparatus for selecting an internet/PSTN changeover server for a packet based phone call is provided. In a first embodiment, the apparatus comprises a storage medium having stored therein a plurality of programming instructions for implementing a set of communication services for facilitating establishment of the voice call to the PSTN extension, and an execution unit, coupled to the storage medium, for executing the plurality of programming instructions. The set of communication services include services for soliciting inputs from one or more other apparatuses on one or more operating characteristics associated with the establishment and support of the voice call to the PSTN extension, and selecting either the apparatus itself, or one of the other apparatuses to place the voice call to the PSTN extension.

In one embodiment, the set of communication services further include services for calculating a call metric, based on the solicited inputs, for each of the responding apparatus and selecting an apparatus to facilitate the voice call based, in part, on the calculated call metric. In one embodiment, the communication services further include telephony services for cooperating with telephony equipment coupled to the apparatus. In one embodiment, the storage medium stores programming instructions for implementing web server functions. Similarly, in one embodiment, the storage medium stores programming instructions for implementing internet service provider functions.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for ease of understanding, certain method steps are delineated as separate steps, however, these separately delineated steps should not be construed as necessarily order dependent in their performance.

Figure 1:
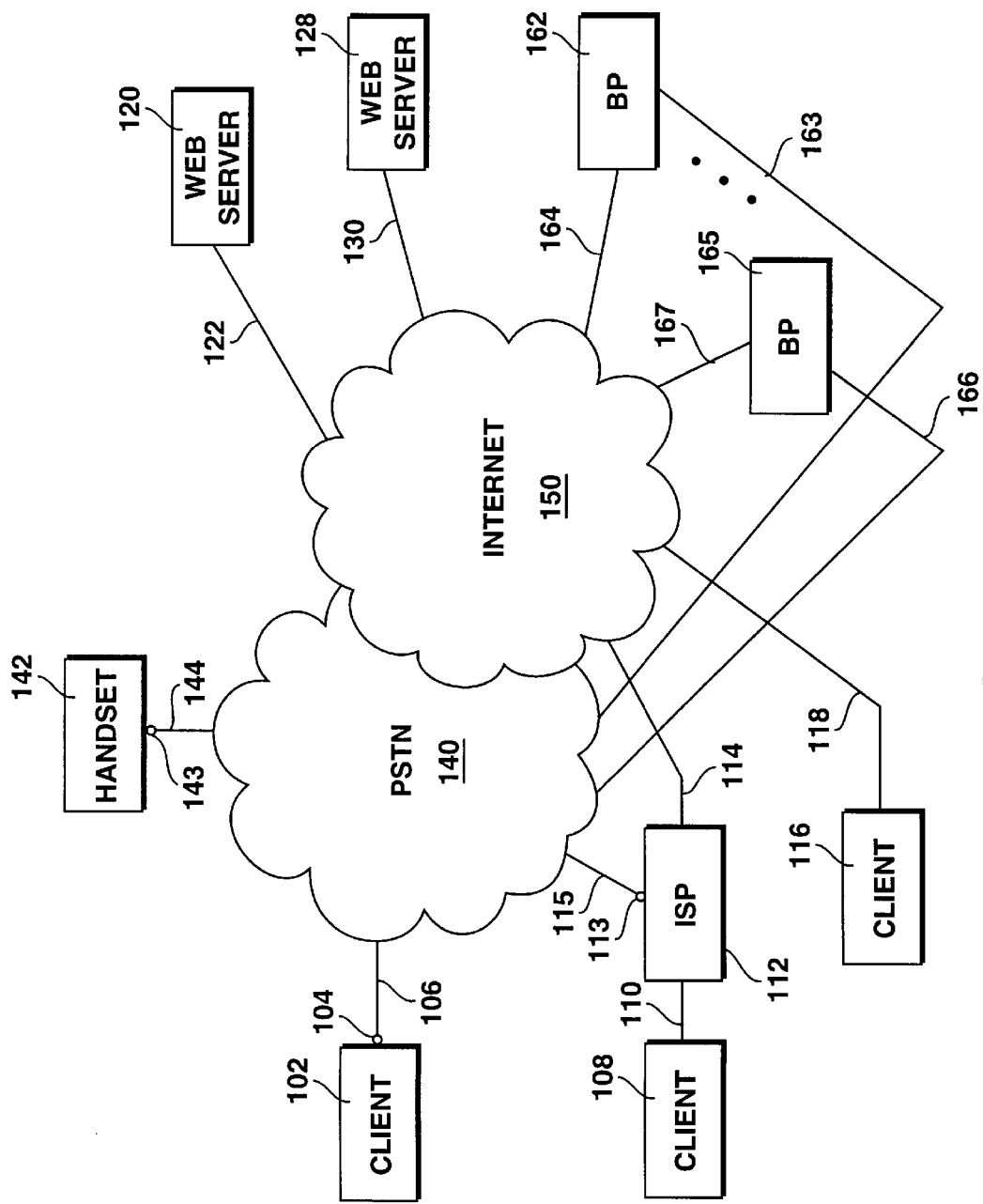
FIG. 1 is a block diagram illustrating an exemplary communication system incorporating the teachings of the present invention.

Referring now to FIG. 1, a block diagram is presented illustrating an exemplary communication system 100 incorporating the teachings of the present invention for connecting a user of an internet telephony enabled client computer with a user of a PSTN endpoint (e.g., telephone handset), and routing the voice call off of the internet. While the present invention will be described in the context of this exemplary computer system, based on the descriptions to follow, those skilled in the art will appreciate that the present invention is not limited to this embodiment, and may be also practiced with intranet (in lieu of the internet) and/or automated/computerized telephony answering equipment (in lieu of telephone handsets).

For the illustrated embodiment, client computer 102 incorporated with the teachings of the present invention, while in data communication with a web server, e.g. web server 128, through PSTN 140 and Internet 150, is presented with a Push-To-Talk™[2] option by web server 128. When client computer 102 selects the Push-To-Talk™ option, a server incorporated with the teachings of the present invention (e.g., bridgeport 162) automatically determines an appropriate destination PSTN extension, e.g. the PSTN extension of telephone handset 142, as well as an appropriate one from a "community" internet/PSTN changeover servers (e.g., bridgeports 162 and 165) to place the voice call to the PSTN extension and facilitate the voice call between the user of client computer 102 and the user of telephone handset 142. In the context of the example embodiment, for differentiation and ease of explanation, bridgeport 162 will be referred to as a "page" bridgeport, while the selected internet/PSTN changeover server (e.g., bridgeport 165) will be referred to as a "changeover" bridgeport. In one embodiment, the Push-To-Talk™ option is pre-associated with page bridgeport 162 by web server 128, and the determination of the destination PSTN extension by page bridgeport 162 is made in accordance with one or more attributes of web server 128, such as the identity of web server 128, and optionally, one or more attributes of client computer 102, such as the zip code of the area client computer 102 is located. In an alternate embodiment, the Push-To-Talk™ option is not pre-associated with bridgeport 162, but rather a page bridgeport is dynamically selected from the community of bridgeports.

[2] Push-To-Talk™ is a Trademark of eFusion™, Incorporated of Beaverton, Oreg.

In FIG. 1, client computer 102, web servers 120 and 128, bridgeports 162 and 165, and handset 142 are communicatively coupled to each other by way of PSTN 140 and internet 150 as shown. More specifically, client computer 102 is coupled to internet 150 by way of an internet service provider (ISP) 112. Client computer 102 is coupled to ISP 112 through PSTN extension 104, communication line 106 and PSTN 140. In other words, for the illustrated embodiment, client computer 102 includes a modulation/demodulation (MODEM) device (not shown) coupled to PSTN extension 104. However, a client computer may be coupled to ISP 112 through a network connection using a network interface instead, such as client computer 108 using network connection 110. Alternatively, a client computer may also be directly coupled to internet 150 such as client computer 116 using direct connection 118.

Web servers 120 and 128 are coupled to internet 150 through connections 122 and 130. Although not illustrated, web servers 120 and 128 may also be coupled to PSTN 140. Similarly, bridgeports 162 and 165 of the present invention are coupled to internet 150 through connections 164 and 167. Bridgeports 162 and 165 are also coupled to PSTN 140 through communication lines 163 and 166 respectively. Handset 142 is coupled to PSTN 140 through PSTN extension 143 and communication line 144.

Communication lines 106, 115 and 144 may simply be plain old telephone service (POTS) communication lines, although other types of communication lines may be used. For example, in the case of communication line 106, it may be an integrated service digital network (ISDN) line, whereas in the case of communication line 115, it may be a T1 (1.533 Mbps) or an E1 (2.0488 Mbps) trunk line. In the case of communication line 144, it may be a wireless cellular connection, a Personal Communications Services (PCS) connection, and the like.

PSTN 140 includes a number of Service Switching Points (SSP), Signal Transfer Points (STP), and Service Control Points (SCP) coupled to each other (not shown). PSTN extension 104 through communication line 106 is coupled to a "local" SSP, which in turn is coupled to a number of other "local" PSTN extensions, including e.g. PSTN extension 113 if ISP 112 is a "local" ISP served by the same SSP. In addition, the "local" SSP is also coupled to an associated STP, which in turn is coupled to other "remote" SSPS. Each of the "remote" SSPs is coupled to a number of "remote" PSTN extensions, including e.g. extension 143, if handset 142 is a "remote" handset served by a "remote" SSP. As is well known in the art, internet 150 includes a number of networks interconnected by routers, interconnecting the various client computers, web servers and bridgeports together. [As described earlier, internet 150 may be a private intranet instead.]

Except for the incorporated teachings of the present invention (to be more fully described below), client computer 102 is intended to represent a broad category of internet telephony enabled computer systems known in the art. An example of such a computer system is a desktop computer system equipped with a high performance microprocessor, such as the Pentium® processor manufactured by Intel Corporation of Santa Clara, Calif. or the Alpha® processor manufactured by Digital Equipment Corporation of Manard, Mass.; a number of audio input and output peripherals/interface for inputting, digitizing and compressing outbound audio, and for decompressing and rendering inbound audio; a communication interface for sending and receiving various data packets (including audio data packets) in accordance with certain standard communication protocol, such as a V.42bis compliant modem or an Ethernet adapter card; a windows-based operating system including internetworking communication services providing support for Transmission Control Protocol/Internet Protocol (TCP/IP) (and other Internet Communication Suite protocols) and socket services, such as Windows™ 95 developed by Microsoft Corporation of Redmond, Wash.; a web communications tool such as Navigator™, developed by Netscape Communications of Mountain View, Calif.; and an internet telephony application, such as the above described IPhone™[3] developed by Intel Corporation.

[3] Note that it is not necessary for the internet telephony application to explicitly support voice calls with telephone handsets, as is the case with IPhone and many of the prior art internet telephony applications.

In one embodiment, the teachings of the present invention are incorporated in client computer 102 in the form of a client application, e.g., a bridgeport driver. The client bridgeport driver may be made available to client computer 102 in a number of alternate means. For example, the client bridgeport driver may be distributed via diskettes produced by a bridgeport vendor, or downloaded from a web server of the bridgeport vendor. In other embodiments, the teachings of the present invention are incorporated in the browser and/or the operating system of client computer 102. For ease of understanding, the remaining descriptions will be presented in the context of the client bridgeport driver embodiment.

Except for the presentation of web pages having Push-To-Talk™ options pre- associated with the bridgeports of the present invention, web servers 120 and 128 are intended to represent a broad category of web servers, including e.g. corporate presence servers and government presence servers, known in the art. Any number of high performance computer servers may be employed as web servers 120 and 128, e.g. a computer server equipped with one or more Pentium® Pro processors from Intel Corp., running Mircrosoft's Windows® NT operating system, or a computer server equipped with one or more SPARC® processors from Sun Microsystems of Mountain View, Calif., running Sun's Solaris® operating system.

Similarly, ISP 112 is intended to represent a broad category of internet service providers. An ISP may be a "small" local internet access provider, or one of a number of point of presence providers offered by a "large" ISP. It is also anticipated that ISP 112 may be incorporated with an SSP of PSTN 140. Handset 142 is intended to represent a broad category of conventional handsets known in the art, including but not limited to desktop handsets, cordless handsets, and wireless handsets. No special features are required of handset 142 for it to be called and connected to internet telephony enabled client computer 102, in accordance with the present invention. [As described earlier, handset 142 may also be automated/computerized telephony answering equipment.]

Before we proceed to describe bridgeports 162 and 165 in further detail, it should be noted that one skilled in the art of, for example, telecommunications, will appreciate that the communication system illustrated in FIG. 1, is significantly more complex than that which is depicted. For example, each SSP of PSTN 140 may service thousands of PSTN extensions, and there are numerous SSPs, STPs and SCPs in a common PSTN implementation. Internet 150 includes well over several hundred thousand networks. Together, PSTN 140 and internet 150 interconnect millions of client computers and web servers. Nonetheless, FIG. 1 does capture a number of the more relevant components of a communication system necessary to illustrate the interrelationship between client computer 102, web server 128, bridgeports 162 and 168, and handset 142, such that one skilled in the art may practice the present invention. Also, while the present invention is being described in the context of client computer 102 being engaged in data communication with web server 128, as will be readily apparent from the description to follow, the present invention may be practiced with any "client" computer engaged in data communication with any "web" or "info" server.

Figure 2:
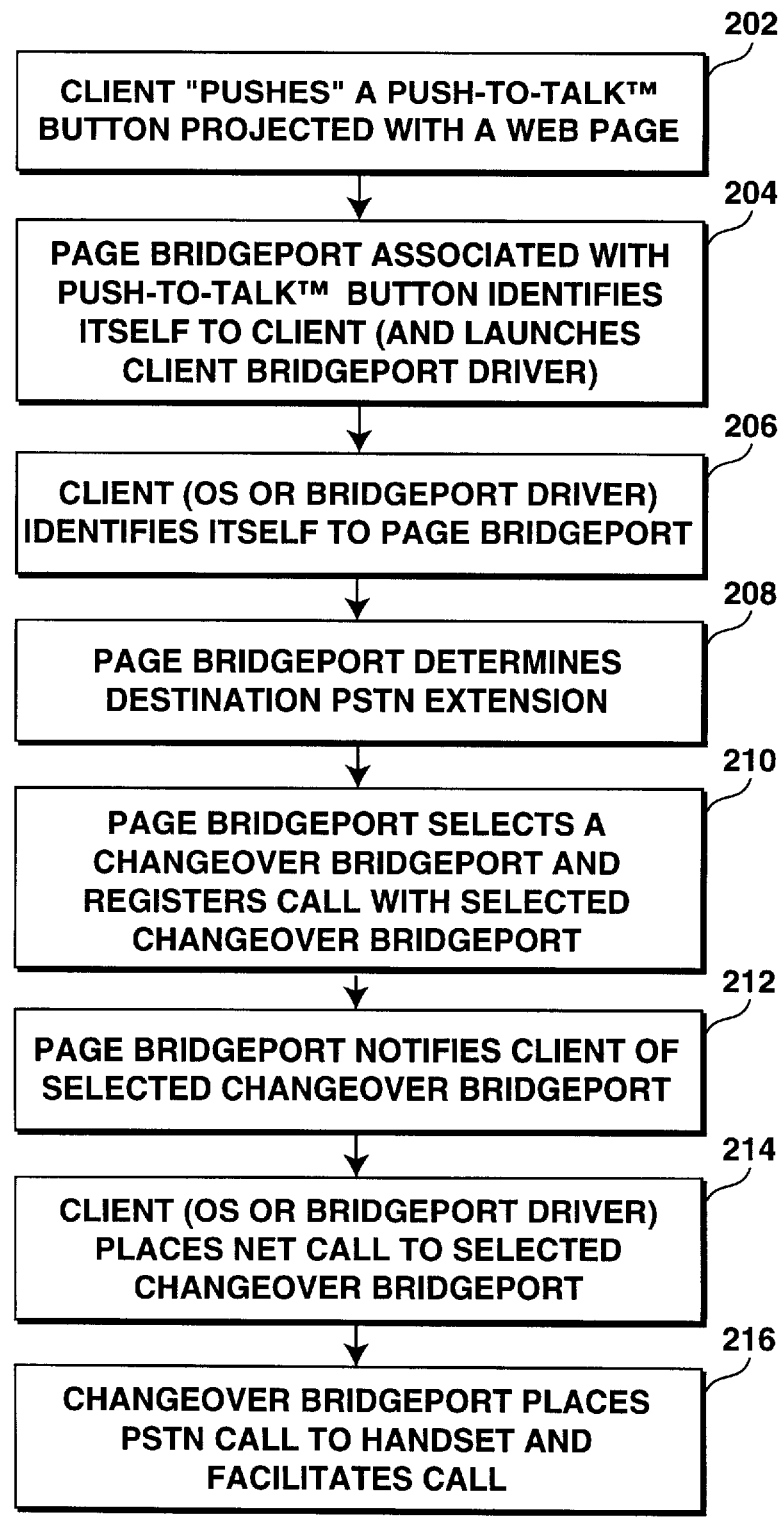
FIG. 2 is a flow chart illustrating a method for establishing a voice communication session with a PSTN extension for a networked client computer, in accordance with one embodiment of the present invention.

Turning now to FIG. 2, a flow chart illustrating one embodiment of the method steps of the present invention for establishing and facilitating a voice call to a PSTN extension for a networked client computer is shown. For ease of explanation, the method of FIG. 2 will be developed in the context of an example implementation, wherein a user of client computer 102 is engaged in a data communication session involving a webpage, projected by web server 128, which incorporates a Push-To-Talk™ feature wherein the user of the webpage may "push" a displayed Push-To-Talk™ button to cause a voice connection with a local office, retail center and the like, associated with the web server, to be established, enabling the user of client computer 102 to engage in a voice call with a user of a PSTN endpoint (e.g., handset 142) located at the "local office". [Those skilled in the art will appreciate that the terms "push" and "pushing" are metaphoric descriptions of the action taken by a user. The action is in actuality accomplished, e.g., by the user clicking a mouse button, upon moving a cursor over the displayed Push-To-Talk™ button.]With reference to FIG. 2, the method begins at step 202 with a user of client computer 102 "pushing" the Push-To-Talk™ button projected with the webpage. As described earlier, the Push-To-Talk™ button is pre-associated with a bridgeport, e.g. page bridgeport 162. In one embodiment, the pre-association is accomplished via HyperText Markup Language (HTML) elements embedded in the web page, identifying the Uniform Resource Locator (URL) of page bridgeport 162. The HTML elements further specify that a Push-To-Talk™ event notice including the URL of web server 128 is to be posted to page bridgeport 162. Thus, in response to the user's "pushing" of the Push-To-Talk™ button, a HyperText Transmission Protocol (HTTP) connection is temporarily established between client computer 102 and page bridgeport 162, and a message posting the Push-To-Talk™ event is sent to page bridgeport 162.

For the illustrated embodiment, in response to the Push-To-Talk™ event notification, page bridgeport 162 identifies itself to client computer 102, providing client computer 102 with its internet protocol (IP) address, step 204. The HTTP connection is closed upon sending the return data to client computer 102 by page bridgeport 162. In one embodiment, the identification and provision of page bridgeport's IP address also includes identification that the information is associated with a Push-To-Talk™ button projected by web server 128. More specifically, the URL of web server 128 is also returned to client computer 102. For the illustrated embodiment, the returned data also includes a command for starting up the client bridgeport driver on client computer 102.

Next, for the illustrated embodiment, client computer 102 identifies itself to page bridgeport 162, providing page bridgeport 162 with its IP address and attributes. For the illustrated embodiment, the identification is performed by the launched client bridgeport driver, by way of another HTTP connection. In one embodiment, the identification is also made in the form of a call request to talk to a person, such as an agent, associated with web server 128. In one embodiment, the attribute information includes a zip code for the area client computer 102 is located. In another embodiment, the attribute information includes a PSTN extension associated with client computer 102. In one embodiment, the URL of web server 128 is also re-transmitted.

In response, page bridgeport 162 determines a destination PSTN extension for the requested call, step 208. In one embodiment, the determination is based on attributes of web server 128, e.g. the URL or the associated corporate name (if provided) of web server 128. In another embodiment, the determination is also based on attributes of client computer 102, e.g. the zip code or the telephone area code/prefix associated with client computer 102. In one embodiment, page bridgeport 162 is equipped with a PSTN extension database having the necessary attributes and PSTN extension information for performing the determination. In an alternate embodiment, page bridgeport 162 is not equipped with such a PSTN extension database, but equipped with services that access external on-line services to make the determination (e.g., on-line directory services, on-line geographic location services, etc.). An example of an on-line geographic location service is MapBlast™ developed by Vicinity Corporation of Palo Alto, Calif.

Upon determining the destination PSTN extension, for the illustrated embodiment, page bridgeport 162 selects an internet/PSTN changeover server. In one embodiment, the internet/PSTN changeover server is a bridgeport, such as bridgeport 165 (hereafter, changeover bridgeport), where the requested voice call would be routed off internet 150 and onto PSTN 140, step 210. In the context of the example embodiment, the selection of the changeover bridgeport is made from a "community" of bridgeports, to be described more fully below. In one embodiment, the "community" of bridgeports are private bridgeports deployed by the owner of web server 128 (e.g., a corporation). In another embodiment, the "community" of bridgeports are public bridgeports deployed by a service company that offers bridgeport services of the present invention, and subscribed by the corporation of web server 128. Note that page bridgeport 162 may select itself as the changeover bridgeport, either because of the selection criteria employed dictate the result, or by virtue of a singleton community, i.e. page bridgeport 162 is the only bridgeport of the "community". For ease of understanding, the remaining descriptions will be presented in the context of bridgeport 165 being the selected changeover bridgeport.

Upon selecting changeover bridgeport 165, for the illustrated embodiment, page bridgeport 162 registers the requested call with changeover bridgeport 165, step 210. In one embodiment, the registration reserves bandwidth on changeover bridgeport 165 for the requested call. In one embodiment, the registration includes provision of the source IP address of the voice call, i.e. the IP address of client computer 102, the source type (e.g. H.323), the destination address, i.e. the destination PSTN extension of handset 142, and the destination type (e.g. POTS).

Next, for the illustrated embodiment, page bridgeport 162 identifies changeover bridgeport 165 to client computer 102, providing client computer 102 with the IP address of changeover bridgeport 165, step 212. In one embodiment, where the call request is made through a HTTP connection, step 212 also includes closing the HTTP connection. In one embodiment, the identification also includes provision of the URL of web server 128. In one embodiment, both the identification, i.e. the IP address of changeover bridgeport 165, and the URL of web server 128 are provided to client bridgeport application.

Next, for the illustrated embodiment, client computer 102 places a net call to changeover bridgeport 165, step 214. In one embodiment, the net call is a H.323 call placed by an internet telephony application. In one embodiment, step 214 also includes automatic launching of the internet telephony application to place the net call, if an internet telephony application has not been previously launched. For the illustrated embodiment, the automatic launching is performed by the client bridgeport driver.

In response, changeover bridgeport 165 places a voice call to the PSTN extension of handset 142, and bridges the net and the voice calls, step 216, thereby allowing a user of client computer 102 to communicate with a user of handset 142. In bridging the two calls, changeover bridgeport 165 digitizes and compresses inbound call signals received from handset 142, and delivers the encoded call signals to client computer 102 via the previously established H.323 connection. The compressed inbound call signals are decompressed by the communication interface of client computer 102 and rendered by the internet telephony application. Similarly, outbound call signals emanating from client computer 102 are digitized by the audio interface, compressed by the communication interface of client computer 102 and delivered to changeover bridgeport 165 via the H.323 connection, wherein they are decompressed, and upon conversion, forwarded to handset 142. In other words, changeover bridgeport 165 converts the voice information between PSTN and IP protocols and delivers voice call information to/from handset 142 and client computer 102 until call completion.

Note that steps 204–206 are all performed automatically in response to step 202, without requiring any intervention from the user of client computer 102. In particular, it does not require the user of client computer 102 to enter the PSTN extension of handset 142, nor the IP address of changeover bridgeport 165. It does not even require the user of client computer 102 to know this information. All that is required of the user is the metaphorical "pushing" of the Push-To-Talk™ button projected by web server 128.

It should also be noted that the voice connection has minimal impact on establishing any additional data connections with any number of web servers 120 and 128. In other words, client computer 102 may continue to browse web pages offered by web servers 120 and 128, while simultaneously supporting the voice connection with handset 142 via changeover bridgeport 165. In addition, although there may be a number of intermediate routers in Internet 150 between changeover bridgeport 165 and client computer 102, changeover bridgeport 165 is the only server charged with supporting both the voice is connection and the H.323 connection, while the voice connection is transparent to the intermediate routers. In other words, the information exchanged between changeover bridgeport 165, through the plurality of intermediate routers of Internet 150, to client computer 102 will appear as normal data packets to the intermediate routers.

Returning now to step 210, as described earlier, page bridgeport 162 selects changeover bridgeport 165 from a community of bridgeports. In one embodiment, page bridgeport 162 first solicits input on a number of call characteristics from each bridgeport member of the community. The call characteristics may include the number of intermediate servers (Is) required to connect client computer 102 with the responding bridgeport member, the toll charge (Tc) that may be incurred by placing the telephone call from the responding bridgeport, the bandwidth (B) currently available on the responding bridgeport, the number of PSTN connections (P) supported by the responding bridgeport, service premiums (S), if any, charged by the responding bridgeport, and so forth. In the context of the example implementation, one member bridgeport may respond with an indication that there are no intermediaries between itself and client computer 102, which may result in a higher quality of service, however, given its connection point to PSTN 140, there may be a significant toll charge incurred in placing the telephone call to handset 142 from this member bridgeport. Alternatively, another member bridgeport may respond with a low toll charge, but with a higher number of intermediaries, which may result in a lower quality voice connection as the voice data will have to route through a large number of routers.

In any event, for the illustrated embodiment, page bridgeport 162 calculates a Call Metric (CM) for each responding bridgeport that is representative of the bridgeport's ability to establish and facilitate the voice call between client computer 102 and handset 142. Equation (1) is an example of an equation used to calculate the Call Metric for each of the responding bridgeport, wherein the bridgeport with the lowest CM is determined to be able to provide the best all around service. It should be noted that equation (1) is merely illustrative, as one skilled in the art will appreciate that suitable alternative equations may be beneficially employed to calculate alternative call metrics.

$$CM_i = W_1(Is_i) + W_2(Tc_i) + \frac{W_3}{B_i} + \frac{W_4}{P_i} + W_5(S_i) \qquad (1)$$

where:

Is number of intermediate servers

Tc toll charge estimate

B available bandwidth on responding server

P number of PSTN ports available on responding server
S premium service charge
W weighting factor In one embodiment of the present invention, the number of intermediate servers (Is) is determined by each of the responding bridgeports from the community of bridgeports through the use of a "traceroute" function, common to the UNIX network operating environment. As one skilled in the art will appreciate, the execution of a "traceroute" command by a bridgeport will produce a result quantifying the number of intermediate routers between the execution bridgeport and a destination address (provided in the command line). Accordingly, in one embodiment, the execution of the command: "traceroute ($IP_{13}$ address)", will return a number representative of the intermediate routers required for the responding bridgeport to communicate with the source address, represented by IP_address.

In one embodiment, an estimate of the toll charge is determined locally at the responding bridgeport by accessing a toll rate table stored on the responding bridgeport. An example toll rate table is depicted in Table 1. As illustrated in the example toll rate table of Table 1, an estimate toll charge is determined by analyzing the components of the destination telephone number against a toll charge hierarchy. If none of the elements of the destination telephone number match (i.e., hit) the elements of the toll rate table, a high toll charge estimate is returned. If, however, there is a hit on the area code and the telephone number prefix, a much lower toll charge or even toll free estimate is returned. In alternate embodiments of the present invention, the responding bridgeport may query the local SSP (i.e., the SSP to which it is coupled) to ascertain a specific toll charge value. In such a case, the communication between the responding bridgeport and the local SSP is conducted via an out-of-band signaling protocol such as Signaling System 7 (SS7).

TABLE 1

TOLL CHARGE LOOKUP TABLE

| Elements of Destination Telephone No. | Relative Toll Charge Estimate |
| --- | --- |
| No Hit | $ $ $ $ |
| Area Code Hit | $ $ |
| Area Code and PSTN Prefix Hit | 0 |

In an alternate embodiment, page bridgeport 162 may also involve client computer 102 in the selection of a suitable changeover bridgeport, by presenting the solicited responses to the client computer 102, in either an uncondensed or a condensed format. Whether client computer 102 should be involved in the selection process is a design choice, a trade off between ease of use (without requiring intervention from the user of client computer 102) and functionality (allowing the user of client computer 102 to veto or influence the selection). Between the two distinct choices, a number of hybrid implementations may be employed without deviating from the spirit and scope of the present invention.

Although bridgeport 162 is being described as the page bridgeport and bridgeport 165 is being described as the changeover bridgeport, it should be recognized that they are all members of the community of bridgeports and, as such, may be beneficially employed as a page bridgeport at one point in time, and as a changeover bridgeport at another point in time, or, in one embodiment, they may be deployed as a page/changeover bridgeport simultaneously. As will be readily apparent from the descriptions to follow, bridgeports 162 and 165 of the present invention can be practiced with computer servers programmed to perform the above described bridgeport functions, thus it is expected that a bridgeport may be integrated with other equipment in a variety of manners, for example, with a web server, an ISP, an STP, and so forth.

Figure 3:
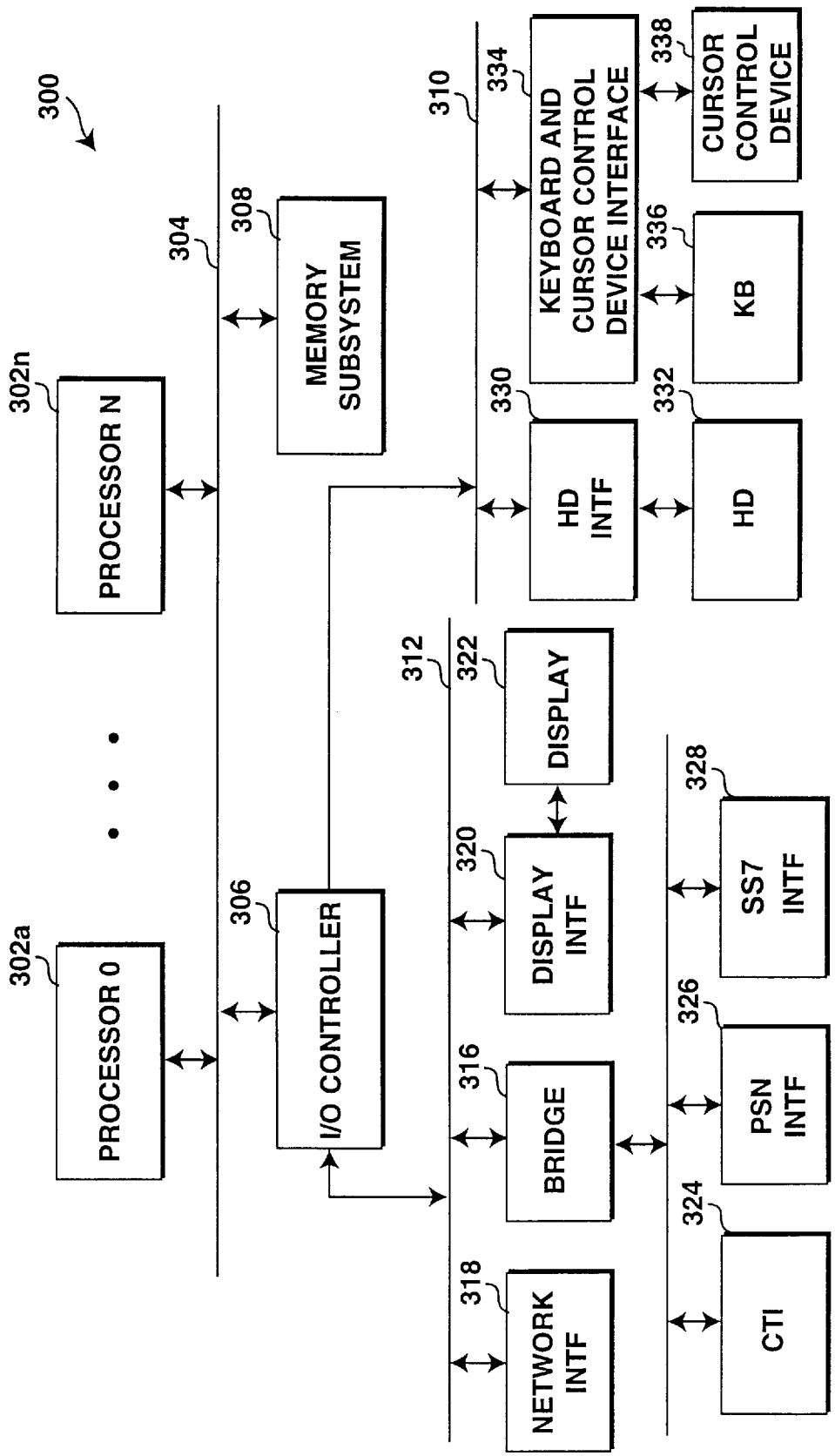
FIG. 3 is a block diagram illustrating an exemplary server suitable for use as a changeover server of the present invention.
Figure 4:
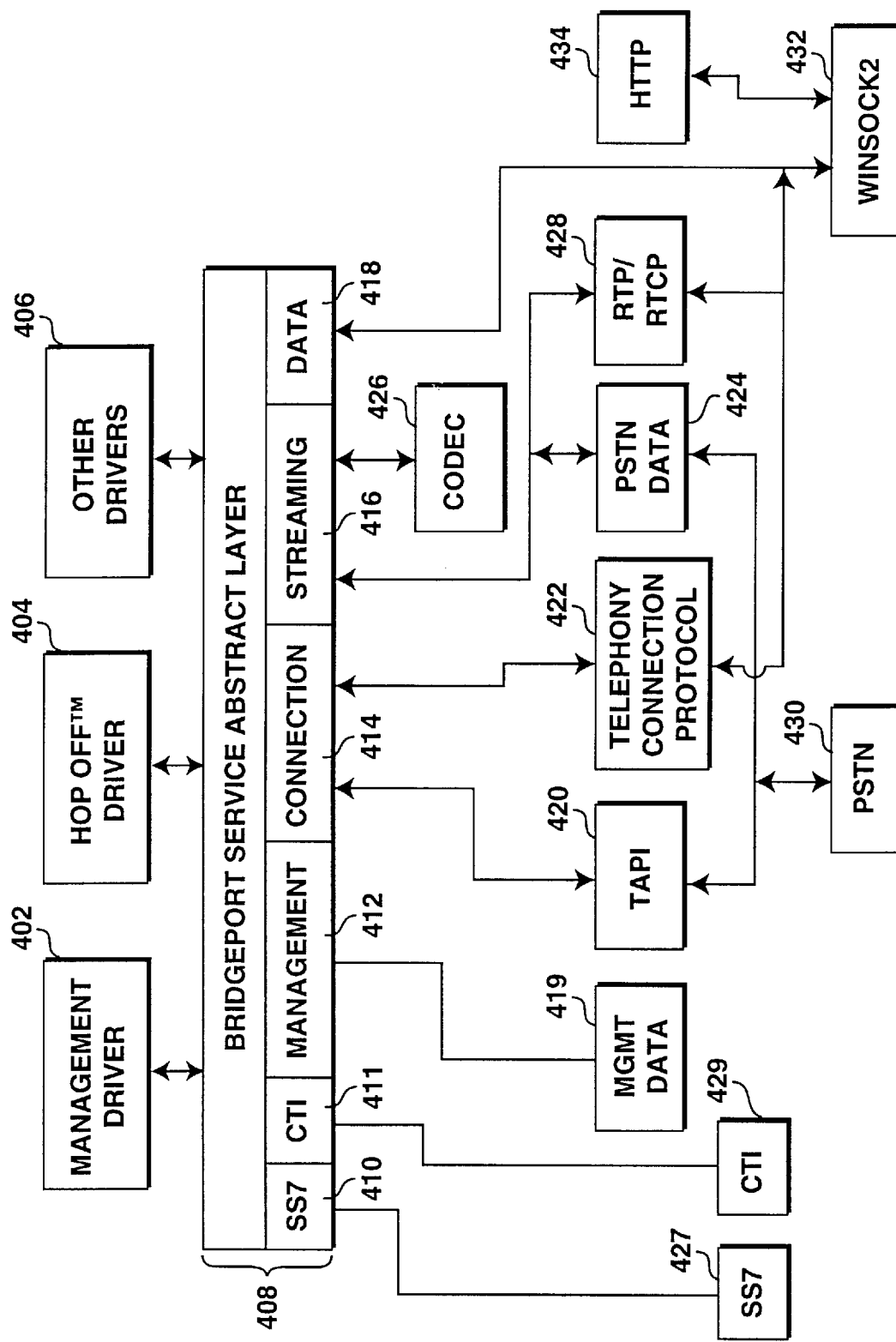
FIG. 4 is a block diagram illustrating the software architecture of the changeover server of FIG. 3, in accordance with one embodiment of the present invention.

Turning now to FIGS. 3 and 4, two block diagrams illustrating the hardware and software elements of an exemplary computer server 300 suitable to be employed as a bridgeport are depicted. As illustrated, exemplary computer server 300 is comprised of multiple processors 302a–302n and memory subsystem 308 coupled to processor bus 304 as depicted. Additionally, computer server 300 is comprised of a second bus 310, a third bus 312 and a fourth bus 314. In one embodiment, buses 312 and 314 are Peripheral Component Interconnect (PCI) buses, while bus 310 is an Industry Standard Architecture (ISA) bus. PCI buses 312 and 314 are bridged by bus bridge 316, and bridged to ISA bus 310 and processor bus 304 by I/O controller 306. Coupled to PCI bus 312 are network interface 318 and display interface 320, which in turn is coupled to display 322. Coupled to PCI bus 314 is computer telephony interface (CTI) 324, PSIN interface 326 and SS7 Interface 328. Coupled to ISA bus 310 are hard disk interface 330, which in turn is coupled to a hard drive 332. Additionally, coupled to ISA bus 310. keyboard and cursor control device 334, which in turn is coupled keyboard 336 and cursor control device 338.

CTI interface 324 provides the necessary hardware to interface exemplary computer server 300 to telephony equipment, such as private branch exchange (PBX) equipment. PSTN interface 326 provides the necessary hardware to interface exemplary computer server 300 to a plurality of PSTN communication lines (e.g., T1, E1 or POTS), wherein the actual number of PSTN communication lines interfaced will be implementation dependent. Additionally, PSTN interface 326 provides advanced DSP-based voice, dual-tone multiple frequency (DTMF) and call progress functionality, which allows for downloadable DSP protocol and voice processing algorithms, thereby providing CODEC support locally on the interface. Examples of supported codecs include the Global System for Mobile Communications (GSM) codec and the ITU-T G.723.1 protocol codecs, the specification for which are commonly available from the GSM consortium and the International Telecommunications Union, respectively. Similarly, SS7 interface 328 provides the hardware necessary to interface exemplary computer server 300 with PSTN trunk lines (e.g., ISDN) supporting the out-of-band communication protocol (e.g., SS7)) used between PSTN network elements (i.e., SSP-SSP, SSP-STP, STP-SCP, etc.). In one embodiment, PSTN interface 326 is preferably an AG-T1™ (for U.S. implementations, while an AG-E1 may be seamlessly substituted for European implementations), while SS7 interface 328 is preferably the TX3000™, both of which, along with their accompanying software drivers, are manufactured by and commonly available from Natural MicroSystems of Natick, Mass. Otherwise, all other elements, processors 302*, memory system 308 and so forth perform their conventional functions known in the art. Insofar as their constitutions are generally well known to those skilled in the art, they need not be further described.

From a software perspective, FIG. 4 illustrates the software elements of exemplary computer server 300. In particular, exemplary computer server 300 is shown comprising an application layer consisting of a Bridgeport Management Driver 402, Hop Off™[4] driver 404, and other drivers 406. Hop Off™ driver 404, supported by Management Driver 402, optional drivers 406, and abstracted service layer 408 implements the method steps of FIG. 2 that are the responsibility of the community of bridgeports (i.e., bridgeports 162, and 165).

[4] Hop Off™ is a Trademark of eFusion™, Incorporated of Beaverton, Oreg.

The Service Abstraction Layer (SAL) 408 is shown comprising SS7 services 410, CTI Services 411, Management Services 412, Connection Services 414, Streaming Services 416, and Data Services 418. The protocol/service layer is shown comprising Telephony Application Programming Interface (TAPI) 420, Telephony Connection Protocol 422, PSTN Data Interface 424, CODEC 426, Real Time (Streaming) Protocol 428, and HTTP server 434. Also shown in this "layer" are configuration management data 419 maintained by management service 412, and codec services 426 employed by streaming services 416. The driver layer is shown comprising SS7 driver 427, CTI driver 429, PSTN driver 430 and socket service 432. Data and control information are exchanged between these elements in the fashion depicted.

Within the context of the present invention, one purpose of SAL 408 is to provide an Application Programming Interface (API) for all the available bridgeport and related services in exemplary computer server 300. The API abstracts out the actual modules used for providing services such as connection establishment (414), streaming and data exchange services (416 and 418). Additionally, SAL 408 provides the common operation tools such as queue management, statistics management, state management and the necessary interface between the plug-in services (i.e., drivers in the driver layer). SAL 408 is also responsible for loading and unloading the appropriate drivers as appropriate.

Connection service 414 includes a connection establishment and tear-down mechanism facilitating the interconnection to the PSTN 140. Additionally, for the illustrated embodiment, connection service 414 employs connection and compatibility services which facilitate interoperation between communication equipment that support industry standards, thereby allowing a variety of communication equipment manufactured by different vendors to be benefited from the present invention. Connection services 414 include, in particular, services for supporting standard video telephony, such as ITU-T's H.323 video telephony, and standard data communication, such as ITU-T's T.120 data communication protocol. Examples of the connection establishment and tear-down mechanisms supported by connection service layer 414 include opening and starting PSTN ports, call control, DTMF collection, and tone generation, to name but a few.

Streaming service 416 is responsible for interfacing with the components that provide the real-time streaming functionality for the multimedia data. Once the connection has been established between the connection points (i.e., PSTN, H.323, etc.), streaming service 416 will take over the management and streaming of data between the two connected parties, until the connection is terminated. Codec service 426 facilitates the above described compression and transmission of inbound call signals from handset 142 as well as decompression and transmission of outbound call signals from client computer 102.

Data service 418 is responsible for providing non real-time peer to peer (i.e., computer-computer) messaging and data exchange between exemplary computer server 300 and other Internet and perhaps PSTN based applications. Sending messages to exemplary computer server end-points (i.e., other similarly equipped bridgeports on the Internet) or other servers within the PSTN is accomplished via data service 418.

CTI services 411 service all communications and automatic call distribution (ACD) necessary for Private Branch Exchange (PBX) based systems. SS7 services 410 service all out of band communications with STPs and/or SCPs of PSTN 140.

PSTN driver 430 is equipped to accommodate particularized PSTN interfaces 326, whereas CTI driver 429 is equipped to support particularized ACD and PBX equipment. Similarly, SS7 driver 427 is equipped to support particularized SS7 interface 328.

While the method and apparatus of the present invention has been described in terms of the above illustrated embodiments, those skilled in the art will recognize that the invention is not limited to the embodiments so described. The present invention can be practiced with modification and alteration within the spirit and scope of the appended claims. Accordingly, the description is to be regarded as illustrative instead of restrictive on the present invention.

Thus, a method and apparatus for selecting an internet/PSTN changeover server for a packet based phone call has been described.

We claim:

1. A computer system comprising:

a storage medium having stored therein a plurality of programming instructions; and an execution unit, coupled to the storage medium to execute the plurality of programming instructions to provide a set of communication services including a service for soliciting inputs from one or more other computer signals on one or more operating characteristics associated with establishment and support of a voice call from a client computer coupled to a packet switched network to a circuit switched network extension, and selecting either said computer system or one of the other solicited computer systems to place the voice call through a circuit switched network to the circuit switched network extension on behalf of the client computer.

2. The computer system of claim 1, wherein the inputs on one or more operating characteristics include an estimate of a number of intermediaries required to connect the client computer to the computer system.

3. The computer system of claim 1, wherein the inputs on one or more operating characteristics include an estimate for toll charges associated with placing the voice call from the selected computer system to the circuit switched network extension.

4. The computer system of claim 1, wherein the communication services calculate corresponding call metrics based on the solicited inputs for the solicited computer systems, and use the calculated call metrics to make the computer system selection.

5. The computer system of claim 1, wherein the communication services further include telephony services for cooperating with telephony equipment coupled to the computer system.

6. The computer system of claim 1, wherein the execution unit further executes the programming instructions to implement web server functions.

7. The computer system of claim 1, wherein the the execution unit further executes the programming instructions to implement internet service provider functions.

8. A method for selecting a computer system to route a packet based phone call, destined for a circuit switched network extension that does not employ pulse code modulation (PCM), off a packet switched network and onto the circuit switched network, the method comprising:

(a) soliciting inputs by a computer system from a plurality of other computer systems on one or more operating characteristics associated with routing the packet based phone call off the packet switched network and onto the circuit switched network at the said other computer systems; and (b) selecting by the soliciting computer system either the said soliciting computer system or one of said other computer systems to route the packet based phone call off the packet switched network and onto the circuit switched network based on the solicited operating characteristic.

9. The method of claim 8, wherein said soliciting input comprises soliciting from each computer system an estimate on a number of intermediaries required to connect the client computer to the computer system.

10. The method of claim 8, said soliciting input comprises soliciting from each of the other computer systems a toll charge estimate for placing a voice call from the particular computer system to the non-PCM circuit switched network extension.

11. The method of claim 8, wherein said selecting comprises calculating corresponding call metrics based on the solicited inputs for the responding computer systems, and use the calculated call metrics to make the selection.

12. A computer system comprising:

a storage medium having stored therein a plurality of programming instructions; and an execution unit, coupled to the storage medium, to execute the plurality of programming instructions to provide a set of communication services including a service to establish and facilitate a voice call from a client computer coupled to a packet switched network to a circuit switched network extension on behalf of a client computer.

wherein the communication services include services to receive solicitation for inputs from a soliciting computer system on one or more operating characteristics associated with the establishment and support of the voice call to the circuit switched network extension, the soliciting computer also soliciting other computer systems for their operating characteristics associated with the establishment and support of the voice call, and wherein the communication services further include services to determine the solicited one or more operating characteristics, and to respond to the solicitation with the determined one or more operating characteristics to enable the soliciting computer system to determine from the solicited operating characteristics whether the soliciting computer system or one of the solicited computer systems is in a better position to place the voice call to the circuit switched network extension through a circuit switched network for the client computer.

13. The computer system of claim 12, wherein the inputs on one or more operating characteristics include an estimate of a number of intermediaries required to connect the client computer to the computer system.

14. The computer system of claim 13, wherein the estimate of the number of intermediaries required to connect the client computer to the computer system is derived from execution of a trace route function.

15. The compute system of claim 12, wherein the inputs on one or more operating characteristics include an estimate for toll charges associated with placing the voice call from the computer system to the non-PCM circuit switched network extension.

16. The computer system of claim 15, wherein the toll rate estimate is retrieved from a toll rate table.

17. The computer system of claim 16, wherein the storage medium further having stored therein the toll rate table.

18. The computer system of claim 16, wherein the toll rate table is located at a signal control point (SCP) of the circuit switched network.

19. The computer system of claim 18, wherein the toll rate table located at the SCP is accessed by the computer system with an out-of-band signaling protocol.

20. The computer system of claim 19, wherein the out-of-band signaling protocol is a Signaling System 7 (SS7) standard protocol.

21. The computer system of claim 12, wherein the communication services calculate corresponding call metrics based on the solicited inputs for the responding computer systems, and use the calculated call metrics to make the computer system selection.

22. The computer system of claim 12, wherein the communication services further include telephony services for cooperating with telephony equipment coupled to the computer system.

23. The computer system of claim 12, wherein the the execution unit further executes the programming instructions to implement web server functions.

24. The computer system of claim 12, wherein the execution unit further executes the programming instructions to implement internet service provider functions.

25. A method for selecting a computer system to route a packet based phone call, destined for a circuit switched network extension, off a packet switched network and onto the circuit switched network, on behalf of a client computer, the method comprising:

(a) receiving solicitation inputs by a computer system from a soliciting computer system for one or more operating characteristics associated with routing the packet based phone call off the packet switched network and onto the circuit switched network on behalf of the client computer, the soliciting computer system also soliciting other computer systems for their operating characteristics associated with routing the packet based phone call;

(b) determining by the solicited computer system the solicited one or more operating characteristics; and (c) responding by the solicited computer system to the said soliciting computer system with the determined one or more operating characteristics, to enable the soliciting computer system to determine from the solicited operating characteristic whether the soliciting computer system or one of the solicited computer systems is in a better position to route the packet based phone call to the circuit switched network extension through the circuit switched network on behalf of the client computer.

26. The method of claim 25, wherein the one or more operating characteristics include an estimate on a number of intermediaries required to connect the client computer to the computer system.

27. The method of claim 26, wherein said determining comprises executing a trace route function.

28. The method of claim 25, wherein the one or more operating characteristics include a toll charge estimate for placing a voice call from the computer system to the non-PCM circuit switched network extension.

29. The method of claim 28, wherein said determining comprises accessing a toll rate table.

30. The method of claim 29, wherein the toll rate table is located locally.

31. The method of claim 29, wherein the toll rate table is located at a signal control point (SCP) of the circuit switched network.

32. The method of claim 31, wherein said selecting further comprises sending and receiving a plurality of out-of-band signaling protocol packets.

33. The method of claim 32, wherein the out-of-band signaling protocol is a Signaling System 7 (SS7) standard protocol.

* * * * *

UNITED STATES PATENT AND TRADEMARK OFFICE
CERTIFICATE OF CORRECTION

PATENT NO. : 5,889,774

DATED : March 30. 1999

INVENTOR(S) : Mirashrafi et al.

It is certified that error appears in the above-identified patent and that said Letters Patent is hereby corrected as shown below:

In column 2 of the first page after "5,327,486 7/1994 Wolff et al. ............ 379/93.23" insert --5,390,169 2/1995 Bernstein ............370/55 --.

In column 2 of the first page after "5,526,353 6/1996 Henley et al. ............ 370/60.1" insert --5,539,884 7/1996 Robrock, II............395/200.12--.

In column 2 of the first page after "FOREIGN PATENT DOCUMENTS" on a new line insert --0 581 087 A1 7/1992 Germany--

In column 2 of the first page after "97/26749 1/1997 WIPO." on a new line insert and center --OTHER PUBLICATIONS--.

In Column 2 of the first page after, "OTHER PUBLICATIONS" on a new line insert --Patent Cooperation Treaty's International Application Publication Number: WO 96/38018, published November 28, 1996, 26 pgs.
Patent Cooperation Treaty's International Search Report for International application No. PCT/SE 96/00680, dated September 20, 1996, 2 pgs.

UNITED STATES PATENT AND TRADEMARK OFFICE
CERTIFICATE OF CORRECTION

PATENT NO. : 5,889,774

DATED : March 30, 1999

INVENTOR(S) : Mirashrafi et al.

It is certified that error appears in the above-identified patent and that said Letters Patent is hereby corrected as shown below:

"Genesys Telecommunications' net.Vectoring Unites Internet, Advanced Callcenter Capabilities, and Two-Way Realtime Video Conferencing," http://www.genesyslab.com/genesys/press/index.html, Genesys Publications, 12/5/95.

Advanced Intelligent Internet, "http://www.genesylab.com.genesys.press/archived/ainn.html, Genesys Publications, 12/13/95 and 1/10/96.

IDT Releases Net2Phone Commercial Version Three Months Ahead of Schedule," IDT Press Release, http://www.idt.net/8-5-96.html, pgs. 1-3, 8/5/96.

"SoundXchange interACTIVE," SoundXchange, http://www.iact.com, pgs. 1-5, 8/9/96.

"Internet Telephones," PC MAGAZINE, pgs. 107, 108, 110, 114, 117, 118, 119, 120; 10/8/96.

Hill, Jon, "Net2Phone Makes the Call," PC MAGAZINE, p.58, 10/22/96.

"IDT Unveils Full-Duplex Version of Net2Phone," IDT press Release, http://www.idt.net/11-21-96.html, pgs. 1-2, 11/21/96.

"IDT Unveils Net2Phone Direct at COMDEX," IDT Press Release, http://www.idt.net/11-21-96.html, pgs. 1-2, 11/21/96.

Abstract, "SET: Bellcore Specification of Signaling System Number 7 (SS7)," http://www.bellcore.com, pg. 1, 1996.

UNITED STATES PATENT AND TRADEMARK OFFICE
CERTIFICATE OF CORRECTION

PATENT NO. : 5,889,774

DATED : March 30, 1999

INVENTOR(S) : Mirashrafi et al.

It is certified that error appears in the above-identified patent and that said Letters Patent is hereby corrected as shown below:

Abstract, "Bellcore Specification of Signaling System Number 7 (SS7)," http://www.bellcore.com, pgs. 1-2, 1996.

"Atlas Telecom Delivers New Enhanced Services Platform Based on Natural MicroSystems Open Telecommunications Technology," http://www.nmss.com/nmsweb/288a_1f6.html, 11/5/96.

Telephony Services Architecture: "Natural Platforms," http://www.nmss.com/nmsweb/2486_1e6.html, 1996.

Natural Platforms: AG-T1 Datasheet "24 Ports of Voice Processing, an integrated T1 Interface, and Natural Media Options," http://www.nmss.com/nmsweb/22b6_1c6.html, 1996.

"Frequently Asked Questions- Technical Support FAQ's," What Is Net2Phone, http://www.net2phone.com/techfaq.html, pgs. 2-8

Net2Phone Info, http://www.net2phone.com/ninfo.html, pg. 1, printed 12/17/96.

"Welcome to the Vicinity Corporation Home Page," http://www.vicinity.com, pgs. 2-3, 1996.

"Microlegend SS7 Tutorial: The SS7 Protocol Stack", http://www.microlegend.com/stack.html, pgs. 1-2, last update May 23, 1997.

"Microlegend SS7 Tutorial: Signaling Connection Control Part", http://www.microlegend.com/sccp.html, pg. 1, last update May 23, 1997.

UNITED STATES PATENT AND TRADEMARK OFFICE
CERTIFICATE OF CORRECTION

PATENT NO. : 5,889,774

DATED : March 30. 1999

INVENTOR(S) : Mirashrafi et al.

It is certified that error appears in the above-identified patent and that said Letters Patent is hereby corrected as shown below:

Microlegend SS7 Tutorial: Transaction Capabilities Application Part:, http://www.microlegend.com/tcap.html, pgs. 1-2, last update May 23, 1997.

"Microlegend SS7 Tutorial: What is SS7?", http://www.microlegend.com/whatss7.html, pgs. 1-3, last update May 25, 1997.

"Microlegend SS7 Tutorial: Message Transfer Part", http://www.microlegend.com/mtp.html, pgs. 1-5, last update June 9 1997.

"Microlegend SS7 Tutorial: ISDN User Part", http://www.microlegend.com/isup.html, pgs. 1-3, last update June 10, 1997.

Telephoney Gateway White Paper, "VocalTec Telephony Gateway," http://www.vocaltec.com, pgs. 2-9; © 1993-1996.--

Signed and Sealed this

Thirteenth Day of June, 2000

*Attest:*

Q. TODD DICKINSON

*Attesting Officer*    *Director of Patents and Trademarks*

UNITED STATES PATENT AND TRADEMARK OFFICE
CERTIFICATE OF CORRECTION

PATENT NO. : 5,889,774
DATED : March 30, 1999
INVENTOR(S) : Mojtaba Mirashrafi, John D. Elliott, Michael F. Buondonno, Kenneth L. Keeler, Keith A. Pirkl, Al J. Simon, George L. Taylor, Mark D. Zuber It is certified that error appears in the above-identified patent and that said Letters Patent is hereby corrected as shown below:

Column 11,
Line 14, delete "traceroute ($IP_{13}$ address)" and insert -- "traceroute (IP_address)"--.

Column 12,
Line 21, delete "PSIN" and insert -- PSTN --.

Column 14,
Line 30, delete "signals" and insert -- systems --.
Line 60, after "wherein" delete -- the --.

Column 15,
Line 7, delete "either the said soliciting computer system or".
Line 12, delete "characteristic" and insert -- characteristics --.
Line 17, after "8," insert -- wherein --.
Line 66, delete "compute" and insert -- computer --.

Column 16,
Line 29, after "wherein" delete -- the --.
Line 52, after "to" delete -- the --.

Signed and Sealed this

Fifth Day of February, 2002

Attest:

JAMES E. ROGAN
*Attesting Officer*     *Director of the United States Patent and Trademark Office*